(12) United States Patent
Yoon et al.

(10) Patent No.: US 7,786,230 B2
(45) Date of Patent: Aug. 31, 2010

(54) METHOD FOR POLYMERIZING CYCLOOLEFIN POLYMER CONTAINING POLAR FUNCTIONAL GROUPS AND ELECTRONICS DEVICES EMPLOYING THE POLYMERIZED CYCLOOLEFINS

(75) Inventors: Sung-Cheol Yoon, Daejeon (KR); Sung-Ho Chun, Daejeon (KR); Won-Kook Kim, Daejeon (KR); Tae-Sun Lim, Daejeon (KR); Heon Kim, Daejeon (KR); Jung-Min Lee, Daejeon (KR)

(73) Assignee: LG Chem, Ltd. (KR)

( * ) Notice: Subject to any disclaimer, the term of this patent is extended or adjusted under 35 U.S.C. 154(b) by 681 days.

(21) Appl. No.: 11/489,848

(22) Filed: Jul. 20, 2006

(65) Prior Publication Data

US 2007/0021576 A1    Jan. 25, 2007

Related U.S. Application Data

(63) Continuation-in-part of application No. 10/502,185, filed on Jul. 21, 2004, now Pat. No. 7,718,744.

(30) Foreign Application Priority Data

Dec. 2, 2003   (KR) .................. 10-2003-0086705

(51) Int. Cl.
*C08F 4/80* (2006.01)
*C08F 10/00* (2006.01)
*C08F 36/00* (2006.01)
*C08F 38/00* (2006.01)
*C08F 26/02* (2006.01)
*C08F 32/00* (2006.01)
*C08F 12/28* (2006.01)
*C08F 118/02* (2006.01)
*C08F 16/12* (2006.01)

(52) U.S. Cl. ............ 526/171; 526/281; 526/282; 526/284; 526/285; 526/301; 526/308; 526/309; 526/310; 526/319; 526/332

(58) Field of Classification Search ........... 526/171, 526/281, 282, 284, 285, 301, 308, 309, 310, 526/319, 332

See application file for complete search history.

(56) References Cited

U.S. PATENT DOCUMENTS

| 3,330,815 A | 7/1967 | McKeon, et al. |
| 4,831,172 A | 5/1989 | Hahn et al. |
| 5,011,730 A | 4/1991 | Tenney et al. |
| 5,179,171 A | 1/1993 | Minami et al. |
| 5,516,456 A | 5/1996 | Shinohara et al. |
| 5,705,503 A | 1/1998 | Goodall et al. |
| 6,455,650 B1 * | 9/2002 | Lipian et al. ............. 526/171 |

FOREIGN PATENT DOCUMENTS

| DE | 109224 | 7/1973 |
| WO | 02088783 A1 | 7/2002 |
| WO | 02088784 | 11/2002 |

OTHER PUBLICATIONS

Chinese Office Action dated Oct. 13, 2006 for Application No. 200380100180.0 (All references cited in Office Action are cited above).
Gaylord, N.G., et al.; "Poly-2,3- and 2,7-Bicyclo[2.2.1]hept-2-enes: Preparation and Structures of Polynorbornenes"; J. Macromol. Sci.-Chem.; A11(5); pp. 1053-1070; 1977.
Kaminsky, W., et al; "Polymerization of Cyclic Olefins with Homogenous Catalysts"; Stud. Surf. Catal.; vol. 56; pp. 425-438; 1990.
Goretzki, R., et al.; "Homogeneous and heterogeneous metallocene/MAO-catalyzed polymerization of functionalized olefins"; Macromol. Chem. Phys.; vol. 200; pp. 881-886; 1999.
Mathew, J.P., et al.; "(n3-Allyl)palladium(II) and Palladium(II) Nitrile Catalysts for the Addition Polymerization of Norbornene Derivatives with Functional Groups"; Macromolecules; vol. 29; pp. 2755-2763; 1996.
Breunig, S., et al.; Transition-metal-catalyzed vinyl addition polymerizations of norbornene derivatives with ester groups; Makromol. Chem.; vol. 193; pp. 2915-2927; 1992.
Hennis, A., et al.; "Novel, Efficient, Palladium-Based System for the Polymerization of Norbornene Derivatives: Scope and Mechanism"; Organometallics; vol. 20; pp. 2802-2812; 2001.
Sen, A., et al.; "Catalysis by Solvated Transition-Metal Cations. Novel Catalytic Transformations of Alkenes by Tetrakis(acetonitrile)palladium Ditetrafluoroborate. Evidence for the Formation of Incipient Carbonium Ions as Intermediates"; J. Am. Chem. Soc.; vol. 103; pp. 4627-4629; 1981.
"Hoechst AG, Mitsu to make cyclo-olefins"; Plastic News; p. 24; Feb. 27, 2005.
International Search Report dated Mar. 24, 2004 for Application No. PCT/KR03/02634.

* cited by examiner

*Primary Examiner*—William K Cheung
(74) *Attorney, Agent, or Firm*—Cantor Colburn LLP

(57) ABSTRACT

Disclosed is a method for preparing a cycloolefin polymer containing polar functional groups, comprising the steps of: a) preparing a catalyst mixture including i) a precatalyst; ii) a first cocatalyst; and iii) a second cocatalyst; and b) subjecting a monomer solution comprising a norbornene-based compound containing a polar functional group to an addition polymerization reaction in the presence of an organic solvent and the catalyst mixture, wherein the product yield of the prepared polymer is 50% by weight or more based on the total weight of the monomer.

15 Claims, No Drawings

METHOD FOR POLYMERIZING CYCLOOLEFIN POLYMER CONTAINING POLAR FUNCTIONAL GROUPS AND ELECTRONICS DEVICES EMPLOYING THE POLYMERIZED CYCLOOLEFINS

CROSS REFERENCE TO RELATED APPLICATION

This application is a continuation-in-part of U.S. patent application Ser. No. 10/502,185, filed on Jul. 21, 2004 now U.S. Pat. No. 7,718,744. This application claims priority to Korean Patent Application No. 10-2002-0076925, filed on Dec. 5, 2002 and Korean Patent Application No. 10-2003-0086705, filed on Dec. 2, 2003, the entire content of which are incorporated herein by reference.

FIELD OF THE INVENTION

The present invention relates to a cycloolefin polymer, more particularly, to a method for polymerizing a high molecular weight of a cycloolefin polymer containing polar functional groups in high yield, and electronic devices employing the cycloolefin polymer.

BACKGROUND OF THE INVENTION

Inorganic materials such as silicon oxides or nitrides have been mainly utilized in the information and electronic industries. Recent technical developments and demands for compact and high efficiency devices need new high performance materials. In this respect, a great deal of attention has been paid to polymers which have desirable physicochemical properties such as low dielectric constant and moisture absorption rate, high adhesion to metals, strength, thermal stability and transparency, and a high glass transition temperature ($T_g > 250°$ C.).

Such polymers can be used as insulating films of semiconductors and TFT-LCDs, protective films of polarizing plates, multi-chip modules, integrated circuits (ICs), printed circuit boards, molding materials for electronic components, optical materials, e.g., flat panel displays, and the like. As one of new performance materials, cycloolefin polymers exhibit much improved properties than conventional olefin polymers, in that they show high transparency, heat resistance and chemical resistance, and have a low birefringence and moisture absorption rate. Thus, cycloolefin polymers can be applied to various applications, e.g., optical components such as CDs, DVDs and POFs (plastic optical fibers), information and electronic components such as capacitor films and low-dielectrics, and medical components such as low-absorbent syringes, blister packagings, etc.

Cycloolefin polymers are known to be prepared by one of the following three methods: ROMP (ring opening metathesis polymerization), copolymerization with ethylene, and addition polymerization using catalysts containing transition metals such as Ni and Pd. These methods are depicted in Reaction Scheme 1 below. Depending on the central metal, ligand and cocatalyst of a catalyst used in the polymerization reaction, polymerization characteristics and the structure and characteristics of polymers to be obtained may be varied.

Reaction Scheme 1

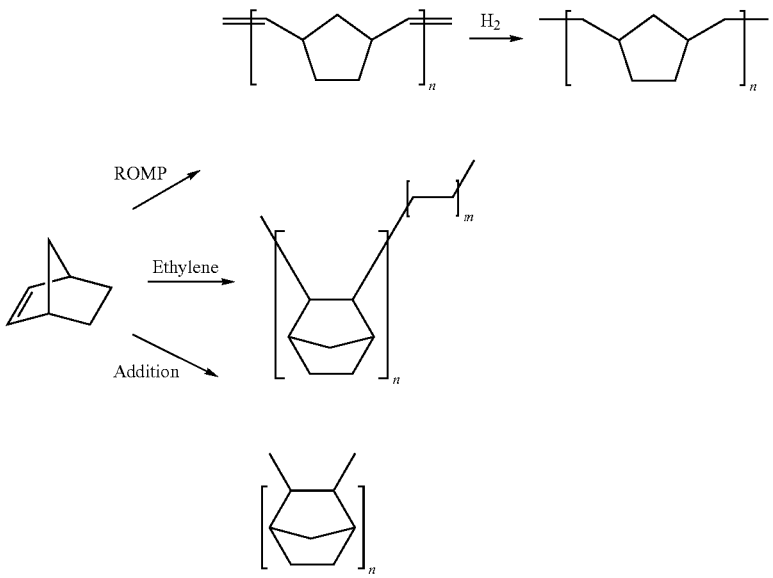

A Polymer prepared by the ROMP method has one double bond per one monomeric repeating unit, thus, the polymer has poor thermal and oxidative stability and is mainly used as thermosetting resins. U.S. Pat. No. 5,011,730 issued to Tenny et al. discloses that such thermosetting resins are fabricated into printed circuit boards by reaction injection molding.

In order to improve physicochemical properties of polymers prepared by the ROMP method, a method of hydrogenation of the ROMP-polymer in the presence of Pd or Raney-Ni catalysts has been proposed. Hydrogenated polymer shows improved oxidative stability, but still needs to be improved in its thermal stability. Further, a cost increased due to additional processes is against its commercial application.

Ethylene-norbornene copolymers are known to be first synthesized using a titanium-based Ziegler-Natta catalyst by Leuna, Corp., (German Patent No. 109,224 issued to Koinzer, P. et al.). However, impurities remaining in the copolymer deteriorates its transparency and its glass transition temperature ($T_g$) is very low, i.e., 140° C. or lower. Although it was reported that the use of a zirconium-based metallocene catalyst enables the synthesis of high molecular weight of polymers having a narrow molecular weight distribution (Plastic News, Feb. 27, 1995, p. 24), as the concentration of a cycloolefin monomer in a reaction medium increases, the catalytic activity decreases and a copolymer to be obtained has a low glass transition temperature ($T_g$<200° C.). In addition, the copolymer has poor mechanical strength and chemical resistance, particularly against halogenated hydrocarbon solvents.

U.S. Pat. No. 3,330,815 discloses a method for preparing cycloolefin polymers in the presence of a palladium-based catalyst. However, molecular weight of the cycloolefin polymer is reported to be 10,000 or less. Gaylord et al. reported a polymerization of norbornene using $[Pd(C_6H_5CN)Cl_2]_2$ as a catalyst (Gaylord, N. G.; Deshpande, A. B.; Mandal, B. M.; Martan, M. J. *Macromol Sci.-Chem.* 1977, A11(5), 1053-1070). Furthermore, Kaminsky et al. reported a homopolymerization of norbornene by using a zirconium-based metallocene catalyst (Kaminsky, W.; Bark, A.; Drake, I. *Stud. Surf. Catal.* 1990, 56, 425). These polymers have a high crystallinity, thermally decompose at a high temperature before they melt, and are substantially insoluble in general organic solvents.

Adhesion of polymers to inorganic surfaces such as silicon, silicon oxide, silicon nitride, alumina, copper, aluminum, gold, silver, platinum, nickel, tantalum, and chromium is often a critical factor in the reliability of the polymer for use as electronic materials. U.S. Pat. No. 4,831,172 discloses a benzocyclobutene (BCB)-functionalized organosilane adhesive aid to increase the adhesion between an inorganic surface and a polymer.

The introduction of functional groups into a norbornene monomer enables the control of chemical and physical properties of a resultant norbornene polymer. U.S. Pat. No. 3,330,815 discloses a method for producing polynorbornenes from norbornene monomers containing polar functional groups. However, catalysts are inactivated by the polar functional groups of norbornene monomers, which results in an earlier termination of the polymerization reaction, thereby producing a norbornene polymer having a molecular weight of 10,000 or less.

In an effort to overcome these problems, a method for polymerizing norbornene derivatives containing polar functional groups after pretreating the norbornene derivatives with silane, alkylaluminum or borane compounds was suggested by Fink, G. et al. (*Macromol Chem. Phys.* 1999, 200, 881). This method is, however, limited in the introduction of the pretreated norbornenes into a polymer chain and in increasing a polymerization activity. In addition, this method further requires a post-treatment step for removing the silane, aluminum or borane compound.

U.S. Pat. No. 5,179,171 discloses a copolymer comprising polymerized units from ethylene and polymerized units from at least one cycloolefin, in which cycloolefin is incorporated in the polymer chain without ring opening in the presence of a catalyst which is formed from a soluble vanadium compound and an organoaluminum compound. However, the polymer thus prepared is thermally unstable, and general physical and chemical properties of the polymer, and its adhesion properties to metals are not greatly improved.

Researches have been carried out in the polymerization of norbornenes containing an ester, acetyl or silyl group, in association with the introduction of polar functional groups (Risse et al., *Macromolecules*, 1996, Vol. 29, 2755-2763; Risse et al., *Makromol. Chem.* 1992, Vol. 193, 2915-2927; Sen et al., *Organometallics* 2001, Vol. 20, 2802-2812; Goodall et al., U.S. Pat. No. 5,705,503; Lipian et al., U.S. Pat. No. 6,455,650).

Sen et al. reported a method for polymerizing various ester norbornene monomers in the presence of a catalyst, $[Pd(CH_3CN)_4][BF_4]_2$, in which exo isomers were selectively polymerized, and the polymerization yield was low. (Sen et al., *J. Am. Chem. Soc.* 1981, Vol. 103, 4627-4629).

U.S. Pat. No. 5,705,503 issued to Risse and Goodall, et al. discloses a polymer prepared from norbornenes containing polar functional groups, in which a majority of the monomer consist of endo-isomers. However, in the polymerization reaction in which polar norbornene derivatives containing only ester groups are polymerized, the molar ratio of a catalyst to the monomers is about 1/100, which is economically disadvantageous.

In the polymerization reaction of polar functional norbornenes containing ester groups or acetyl groups, it has been reported that an excess of the catalyst is required (1/100 to 1/400 relative to the monomer) and the removal of the catalyst residues after polymerization is difficult. U.S. Pat. No. 6,455,650 issued to Lipian et al. discloses a method for polymerizing norbornene derivatives in the presence of a small amount of a catalyst. However, the product yield in a polymerization of a polar monomer such as an ester-norbornene, is only 5%.

Sen et al. reported a method for polymerizing an ester-norbornene in the presence of a catalyst system including $[(1,5\text{-Cyclooctadiene})(CH_3)Pd(Cl)]$, $PPh_3$, and $Na^{+1}3,5\text{-}(CF_3)_2C_6H_3]_4B^-$, in which the polymerization yield of ester-norbornenes is 40% or lower, the molecular weight of the polymer is 6,500 or lower, and the molar amount of the catalyst used is about 1/400 based on the monomer (Sen et al., *Organometallics* 2001, Vol. 20, 2802-2812).

Risse et al. reported a method for polymerizing a methyl-ester-norbornene in the presence of $[(\eta^3\text{-ally})PdCl]_2$ and $AgBF_4$ or $AgSbF_6$ as a catalyst (Risse et al., *Macromolecules*, 1996, Vol. 29, 2755-2763). The polymerization yield is about 60%, and the molecular weight of a resultant polymer is about 12,000. In addition, an excess of the catalyst of about 1/50 by mole, based on the monomer is used. The reason for the use of an excess of the catalyst is explained by the fact that polar functional groups of the monomers such as ester or acetyl groups are coordinated to the active sites of the catalyst, causing steric hindrance effects preventing the norbornene derivatives from approaching onto the active sites, or cationic active sites are electrically neutralized by the polar functional groups, causing a weak interaction with the double bond of norbornene (Risse et al., *Macromolecules*, 1996, Vol. 29, 2755-2763; Risse et al., *Makromol. Chem.* 1992, Vol. 193, 2915-2927).

Therefore, conventional methods for polymerizing cycloolefins containing polar functional groups fail to meet a certain desired level in the aspect of polymerization yield, a molecular weight of a resultant polymer, and a molar ratio of a catalyst to monomers.

SUMMARY OF THE INVENTION

In one aspect, the present invention provides a method for preparing a high molecular weight of cycloolefin polymer containing polar functional groups in high yield.

In another aspect, the present invention provides a method for preparing a polar cycloolefin homopolymer, or copolymer comprising monomeric units of the same or different polar functional cycloolefins, or a polar functional copolymer comprising polar and non-polar cycloolefin monomers.

In a further aspect, the present invention provides a method for preparing a cycloolefin polymer containing polar functional groups which has a low dielectric constant, a low moisture absorption rate, a high glass transition temperature, a desirable thermal and oxidative stability, desirable chemical resistance, toughness and adhesion to metals.

In yet another aspect, the present invention provides a method for preparing a cycloolefin polymer containing polar functional groups which has a sufficient adhesion to metal substrates such as copper, silver, gold, and the like.

In still another aspect, the present invention provides a method for preparing a cycloolefin polymer containing polar functional groups which has desirable optical properties for use as optical films, protective films of polarizing plates, and the like.

In still another aspect, the present invention provides a method for preparing a cycloolefin polymer containing polar functional groups which is applicable as materials for electronic components such as integrated circuits (ICs), printed circuit boards and multichip modules.

In still another aspect, the present invention provides a method for preparing a cycloolefin polymer containing polar functional groups which has a sufficient adhesion to substrates of electronic components in the absence of a coupling agent.

In still another aspect, the present invention provides an optical film fabricated from a cycloolefin polymer containing polar functional groups manufactured by the present method.

In one aspect, there is provided a method for preparing a cycloolefin polymer containing polar functional groups, which comprises the steps of:

preparing a catalyst mixture including i) a precatalyst represented by Chemical Formulae 1a, 1b, or 1c, containing a Group 10 transition metal having a ligand containing oxygen ions bonded to the metal;

ii) a first cocatalyst which is an organic compound containing a Group 15 element; and iii) a second cocatalyst which is capable of providing an anion and weakly coordinating to the metal of the precatalyst; and subjecting a monomer solution comprising a norbornene-based compound containing a polar functional group to an addition polymerization reaction in the presence of an organic solvent and the catalyst mixture, at a temperature of 80-200° C., wherein the total amount of the organic solvent is 50-800% by weight based on the total weight of the monomer contained in the monomer solution.

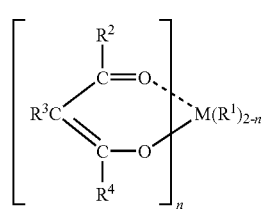

Chemical Formula 1a

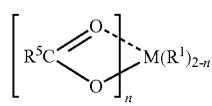

Chemical Formula 1b

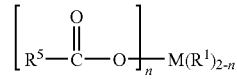

Chemical Formula 1c wherein

M is a Group 10 transition metal, n is 1 or 2, $R^1$ is hydrogen; halogen; a linear or branched $C_{1-20}$ alkyl, allyl, alkenyl, or vinyl group; a $C_{3-12}$ cycloalkyl group unsubstituted or substituted with hydrocarbon(s); a $C_{6-40}$ aryl group unsubstituted or substituted with hydrocarbon(s); a $C_{6-40}$ alkyl or aryl group containing at least one hetero atom; a $C_{7-15}$ aralkyl group unsubstituted or substituted with hydrocarbon(s); a linear or branched $C_{3-20}$ alkynyl group; or anion thereof, and each of $R^2$, $R^3$, $R^4$, and $R^5$ is respectively selected from the group consisting of a hydrogen; a linear or branched $C_{1-20}$ alkyl, alkenyl, or vinyl group; a $C_{3-12}$ cycloalkyl group unsubstituted or substituted with hydrocarbon(s); a $C_{6-40}$ aryl group unsubstituted or substituted with hydrocarbon(s); a $C_{6-40}$ alkyl or aryl group containing at least one hetero atom; a $C_{7-15}$ aralkyl group unsubstituted or substituted with hydrocarbon(s); a linear or branched $C_{3-20}$ alkynyl group; or a linear or branched $C_{1-20}$ alkyl, aryl, aralkyl, alkenyl group containing at least one hetero atom including Si, Ge, S, O, or N; or a linear or branched $C_{1-20}$ alkyl, aryl, aralkyl, or alkenyl group containing one to ten halogen atom(s).

In another aspect, the present invention provides an optical anisotropic film comprising a cycloolefin polymer containing polar functional groups which has a weight average molecular weight of 100,000 or more.

In still another aspect, there is provided a display device comprising an optical anisotropic film containing a cycloolefin polymer containing polar functional groups which has a weight average molecular weight of 100,000 or more.

DETAILED DESCRIPTION OF THE INVENTION

Hereinafter, the present invention will now be described in more detail.

According to the present invention, a high molecular weight of a cycloolefin polymer from a monomer mixture comprising a norbornene-based compound containing a polar functional group is prepared using a specific catalyst system in a specific condition.

According to the present invention, a cycloolefin polymer having a molecular weight of at least 100,000 is prepared with a small amount of a catalyst in a high yield of 50% or more by weight based on the total weight of the monomers contained in the monomer mixture while maintaining the activity of the catalyst even at a high reaction temperature.

The catalyst system used in the present invention is determined to be thermally stable at a temperature of 80° C. or higher in accordance with a spectroscopic analysis. While not being bound by a specific theory, it is believed that catalytic sites of the catalyst system is activated by the suppression of an interaction between polar functional groups of a cycloolefin monomer and a cationic catalyst is prevented at a high temperature, and the double bond of the cycloolefin monomer is inserted into the activated catalytic sites of the catalyst. Therefore, the polymerization reaction is not terminated until a high molecular weight of a polymer is formed.

The catalyst system of the present invention includes i) a precatalyst represented by Chemical Formulae 1a, 1b, or 1c, containing a Group 10 transition metal having a ligand containing oxygen ions bonded to the metal; ii) a first cocatalyst which is an organic compound containing a Group 15 element; and iii) a second cocatalyst which is capable of providing an anion and weakly coordinating to the metal of the precatalyst.

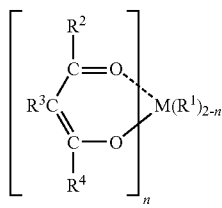

Chemical Formula 1a

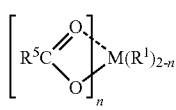

Chemical Formula 1b

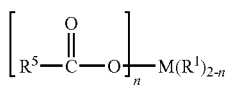

Chemical Formula 1c wherein

M is a Group 10 transition metal, n is 1 or 2, $R^1$ is hydrogen; halogen; a linear or branched $C_{1-20}$ alkyl, allyl, alkenyl, or vinyl group; a $C_{3-12}$ cycloalkyl group unsubstituted or substituted with hydrocarbon(s); a $C_{6-40}$ aryl group unsubstituted or substituted with hydrocarbon(s); a $C_{6-40}$ alkyl or aryl group containing at least one hetero atom; a $C_{7-15}$ aralkyl group unsubstituted or substituted with hydrocarbon(s); a linear or branched $C_{3-20}$ alkynyl group; or anion thereof, and each of $R^2$, $R^3$, $R^4$, and $R^5$ is respectively selected from the group consisting of a hydrogen; a linear or branched $C_{1-20}$ alkyl, alkenyl, or vinyl group; a $C_{3-12}$ cycloalkyl group unsubstituted or substituted with hydrocarbon(s); a $C_{6-40}$ aryl group unsubstituted or substituted with hydrocarbon(s); a $C_{6-40}$ alkyl or aryl group containing at least one hetero atom; a $C_{7-15}$ aralkyl group unsubstituted or substituted with hydrocarbon(s); a linear or branched $C_{3-20}$ alkynyl group; or a linear or branched $C_{1-20}$ alkyl, aryl, aralkyl, alkenyl group containing at least one hetero atom including Si, Ge, S, O, or N; or a linear or branched $C_{1-20}$ alkyl, aryl, aralkyl, or alkenyl group containing one to ten halogen atom(s).

In the catalyst system, it is preferable that the precatalyst is selected from the group consisting of a Pd(II)β-diketonate, allyl Pd(II)β-ketonate, and Pd(II)carboxylate.

The first cocatalyst is represented by Chemical Formula 2 or Chemical Formula 3, and the organic compound of the first cocatalyst has an unshared electron pair and serves as an electron donor.

$D-(R^6)_{3-c}[X(R^6)_d]_c$  Chemical Formula 2

$(R^6)_2D-(R^7)-D(R^6)_2$  Chemical Formula 3 wherein

D is a Group 15 element,

X is an oxygen, sulfur, nitrogen or silicon, c is an integer of 0 to 3, d is 1 when X is an oxygen or sulfur, 2 when X is a nitrogen atom, or 3 when X is a silicon, $R^6$ is hydrogen; a linear or branched $C_{1-20}$ alkyl, alkoxy, allyl, alkenyl or vinyl group; a $C_{3-12}$ cycloalkyl group unsubstituted or substituted with hydrocarbon(s); a $C_{6-40}$ aryl group unsubstituted or substituted with hydrocarbon(s); a $C_{7-15}$ aralkyl group unsubstituted or substituted with hydrocarbon(s); a linear or branched $C_{3-20}$ alkynyl group; a tri(linear or branched $C_{1-10}$ alkyl) silyl or tri(linear or branched $C_{1-10}$ alkoxy) silyl group; a tri($C_{3-12}$ cycloalkyl unsubstituted or substituted with hydrocarbon(s)) silyl group; a tri($C_{6-40}$ aryl unsubstituted or substituted with hydrocarbon(s)) silyl group; a tri($C_{6-40}$ aryloxy unsubstituted or substituted with hydrocarbon(s)) silyl group; a tri(linear or branched $C_{1-10}$ alkyl) siloxy group; a tri($C_{3-12}$ cycloalkyl unsubstituted or substituted with hydrocarbon(s)) siloxy group; or tri($C_{6-40}$ aryl unsubstituted or substituted with hydrocarbon(s)) siloxy group, in which all these substituents may be substituted with a linear or branched haloalkyl group or at least one halogen, and $R^7$ is a linear or branched $C_{1-5}$ alkyl, alkenyl or vinyl group; a $C_{3-12}$ cycloalkyl group unsubstituted or substituted with hydrocarbon(s); a $C_{6-20}$ aryl group unsubstituted or substituted with hydrocarbon(s); or a $C_{7-15}$ aralkyl group unsubstituted or substituted with hydrocarbon(s).

Furthermore, the first cocatalyst is preferably a tricyclohexylphosphine.

The second cocatalyst is a salt represented by Chemical Formula 4.

[Cation]$_a$[Anion]$_b$  Chemical Formula 4

Wherein

Cation is selected from the group consisting of proton; cations of Group 1 metal, Group 2 metals, or transition metals; and organic groups containing these cations, to which unshared electron pairs of the organic compound of the first catalyst may be bonded;

Anion is an anion capable of weakly coordinating to the metal M of the precatalyst, and is selected from the group consisting of borate, aluminate, [SbF$_6$]$^-$, [PF$_6$]$^-$, [AsF$_6$]$^-$, perfluoroacetate ([CF$_3$CO$_2$]$^-$), perfluoropropionate ([C$_2$F$_5$CO$_2$]$^-$), perfluorobutyrate ([CF$_3$CF$_2$CF$_2$CO$_2$]$^-$), perchlorate ([ClO$_4$]$^-$), p-toluenesulfonate ([p-CH$_3$C$_6$H$_4$SO$_3$]$^-$), [SO$_3$CF$_3$]$^-$, boratabenzene, and carborane unsubstituted or substituted with at least one halogen atom; and a and b are the number of the cations and anions, respectively, and determined to allow the cation and anion to be electrically neutralized and balance the charges.

The organic group containing the cation of Chemical Formula 4 is selected from the group consisting of ammoniums [NH(R$^8$)$_3$]$^+$, [NH$_2$(R$^8$)$_2$]$^+$, [NH$_3$(R$^8$)$_1$]$^+$, and [N(R$^8$)$_4$]$^+$; phosphoniums [PH(R$^8$)$_3$]$^+$, [PH$_2$(R$^8$)$_2$]$^+$, [PH$_2$(R$^8$)$_1$]$^+$, and [P(R$^8$)$_4$]$^+$; carboniums [C(R$^8$)$_3$]$^+$; [H(OEt$_2$)$_2$]$^+$; [Ag]$^+$; and [Cp$_2$Fe]$^-$, in which R$^8$ is a linear or branched $C_{1-20}$ alkyl group; an alkyl or silylalkyl group substituted with at least one halogen; a $C_{3-12}$ cycloalkyl group unsubstituted or substituted with hydrocarbon(s); a cycloalkyl or silyl cycloalkyl group substituted with at least one halogen; a $C_{6-40}$ aryl group unsubstituted or substituted with hydrocarbon(s); an aryl or silyl aryl group substituted with at least one halogen; a $C_{7-15}$ aralkyl group unsubstituted or substituted with hydrocarbon(s); or an aralkyl or silyl aralkyl group substituted with at least one halogen.

The borate or aluminate of Chemical Formula 4 is an anion represented by Chemical 4a or 4b.

[M'(R$^9$)$_4$]  Chemical Formula 4a

[M'(OR$^9$)$_4$]  Chemical Formula 4b wherein

M' is a boron or aluminum;

$R^9$ is a halogen; a linear or branched $C_{1-20}$ alkyl or alkenyl group unsubstituted or substituted with at least one halogen atom; a $C_{3-12}$ cycloalkyl group unsubstituted or substituted with at least one halogen; a $C_{6-40}$ aryl group unsubstituted or substituted with hydrocarbon(s); a $C_{6-40}$ aryl group substituted with a linear or branched $C_{3-20}$ trialkylsiloxy group or a linear or branched $C_{18-48}$ triarylsiloxy group; or a $C_{7-15}$ aralkyl group unsubstituted or substituted with at least one halogen.

Furthermore, the second cocatalyst is preferably a dimethyl aniliniumtetrakis(pentafluorophenyl)borate.

The catalyst mixture includes a metal catalyst complex containing a cation complex made of the precatalyst and the first catalyst, and an anion complex made of the second cocatalyst.

In one embodiment of the invention, the catalyst mixture comprises, based on 1 mole of the precatalyst containing Group 10 transition metal, 1-3 moles of the first cocatalyst containing the organic compound containing the Group 15 element; and 1-2 moles of the second cocatalyst which is capable of providing an anion and weakly coordinating to the metal of the precatalyst.

In accordance with the present invention, a catalyst mixture including a precatalyst containing a Group 10 transition metal having a ligand containing oxygen ions bonded to the metal of Chemical Formula 1, a first cocatalyst of an organic compound containing a Group 15 element and a second cocatalyst which is capable of providing an anion and weakly coordinating to the metal of the precatalyst. Then, in the presence of an organic solvent and the catalyst mixture, a monomer solution comprising a norbornene-based compound containing a polar functional group is subjected to an addition polymerization reaction at a temperature of 80-200° C. The temperature for a polymerization reaction is preferably 80-170° C., and more preferably 80-150° C.

Preferably, the organic solvent is selected from the group consisting of dichloromethane, dichloroethane, toluene, chlorobenzene and mixtures thereof. The total amount of the organic solvent in the reaction system is 50-800% by weight based on the total weight of the monomer contained in the monomer solution. The total amount of the organic solvent in the reaction system can be varied within the defined range, for example, 50-400% by weight, or 50-200% by weight, based on the total weight of the monomer contained in the monomer solution.

In the polymerization reaction system, the molar ratio of the catalyst mixture based on the Group 10 transition metal compound to the monomers contained in the monomer solution is in the range of 1:2,500-1:100,000. This ratio of the catalyst to the monomers is far smaller than that used in conventional polymerization reaction system for preparing a polar cycloolefin polymer, however it is sufficient to exhibit catalytic activity in the method of the present invention for preparing a high molecular weight of a cycloolefin polymer. Preferably, the molar ratio of the catalyst system to the monomers is in the range of 1:5,000~1:20,000, based on the Group 10 transition metal compound of the precatalyst.

In the present method, the catalyst is added into the polymerization reaction system in a preformed catalyst system in the form of a mixture or a complex of the respective catalyst components, i.e. the Group 10 transition metal compound, the organic compound containing a Group 15 element and the salt for providing an anion. Further, each catalyst components can be directly added into the polymerization reaction system without being preformed.

In the present method, a norbornene-based compound is used for preparing a polar functional cycloolefin polymer. The norbornene-based monomer or a derivative thereof refers to a monomer containing at least one norbornene (bicyclo [2.2.1]hept-2-ene)) unit represented by Chemical Formula 5 below.

The polar functional group of the nonbonene-based compound contained in the monomer solution is preferably an ester group or an acetyl group.

The norbornene-based monomer containing polar functional groups may be a mixture of endo- and exo-isomers, and the composition ratio between the isomers is not specifically limited.

In one embodiment of the invention, the norbornene-based compound containing a polar functional group is represented by the following Chemical Formula 5.

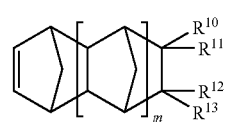

Chemical Formula 5 wherein m is an integer of 0 to 4, at least one of $R^{10}$, $R^{11}$, $R^{12}$ and $R^{13}$ is a polar functional group, and the others of $R^{10}$, $R^{11}$, $R^{12}$ and $R^{13}$ are a non-polar functional group which can be bonded together to form a saturated or unsaturated $C_{3-20}$ cyclic group or $C_{6-24}$ aromatic ring, wherein the non-polar functional group is selected from the group consisting of hydrogen; halogen; a linear or branched $C_{1-20}$ alkyl group, alkenyl group, or vinyl group; a linear or branched $C_{1-20}$ haloalkyl group, or haloalkenyl group; a linear or branched $C_{3-20}$ alkynyl group, or haloalkynyl group; a $C_{3-12}$ cycloalkyl group unsubstituted or substituted with alkyl, alkenyl, alkynyl, halogen, haloalkyl, haloalkenyl, or haloalkynyl; a $C_{6-40}$ aryl group unsubstituted or substituted with alkyl, alkenyl, alkynyl, halogen, haloalkyl, haloalkenyl, or haloalkynyl; and a $C_{7-15}$ aralkyl group unsubstituted or substituted with alkyl, alkenyl, alkynyl, halogen, haloalkyl, haloalkenyl, or haloalkynyl, and the polar functional group includes a non-hydrocarbonaceous polar group containing at least one of O, N, P, S, Si and B, and is selected from the group consisting of $OR^{15}$, $R^{14}OR^{15}$, $OC(O)OR^{15}$, $R^{14}OC(O)OR^{15}$, $C(O)R^{15}$, $R^{14}C(O)R^{15}$, $OC(O)R^{15}$, $R^{14}OC(O)R^{15}$, $C(O)OR^{15}$, $R^{14}C(O)OR^{15}$, $(R^{14}O)_pOR^{15}$, $(OR^{14})_pOR^{15}$, $C(O)OC(O)R^{15}$, $R^{14}C(O)OC(O)R^{15}$, $SR^{15}$, $R^{14}SR^{15}$, $SSR^{15}$, $R^{14}SSR^{15}$, $S(=O)R^{15}$, $R^{14}S(=O)R^{15}$, $R^{14}C(=S)R^{15}$, $R^{14}C(=S)SR^{15}$, $R^{14}SO_3R^{15}$, $SO_3R^{15}$, $R^{14}N=C=S$, $NCO$, $R^{14}NCO$, $CN$, $R^{14}CN$, $NNC(=S)R^{15}$, $R^{14}NNC(=S)R^{15}$,

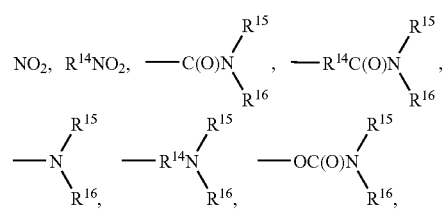

-continued

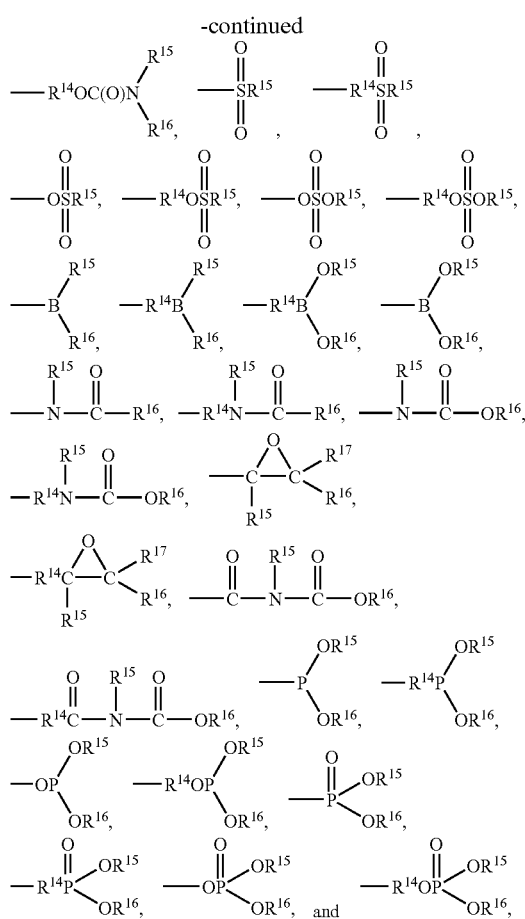

in which p is an integer of 1 to 10, $R^{14}$ is halogen; a linear or branched $C_{1-20}$ alkyl group; a linear or branched $C_{1-20}$ haloalkyl group; a linear or branched $C_{1-20}$ alkenyl group or vinyl group; a linear or branched $C_{1-20}$ haloalkenyl group; a linear or branched $C_{3-20}$ alkynyl group; a linear or branched $C_{3-20}$ haloalkynyl; a $C_{3-12}$ cycloalkyl group unsubstituted or substituted with alkyl, alkenyl, alkynyl, halogen, haloalkyl, haloalkenyl, or haloalkynyl; a $C_{6-40}$ aryl group unsubstituted or substituted with alkyl, alkenyl, alkynyl, halogen, haloalkyl, haloalkenyl, or haloalkynyl; and a $C_{7-15}$ aralkyl group unsubstituted or substituted with alkyl, alkenyl, alkynyl, halogen, haloalkyl, haloalkenyl, or haloalkynyl, and $R^{15}$, $R^{16}$, and $R^{17}$ are each independently hydrogen; a halogen; a linear or branched $C_{1-20}$ alkyl group; a linear or branched $C_{1-20}$ haloalkyl group; a linear or branched $C_{1-20}$ alkenyl group; a linear or branched $C_{1-20}$ haloalkenyl group; a linear or branched $C_{3-20}$ alkynyl group; a linear or branched $C_{3-20}$ haloalkynyl; a $C_{3-12}$ cycloalkyl group unsubstituted or substituted with alkyl, alkenyl, alkynyl, halogen, haloalkyl, haloalkenyl, or haloalkynyl; a $C_{6-40}$ aryl group unsubstituted or substituted with alkyl, alkenyl, alkynyl, halogen, haloalkyl, haloalkenyl, or haloalkynyl; a $C_{7-15}$ aralkyl group unsubstituted or substituted with alkyl, alkenyl, alkynyl, halogen, haloalkyl, haloalkenyl, or haloalkynyl; alkoxy; haloalkoxy; carbonyloxy; or halocarbonyloxy.

Furthermore, the polar functional group of Chemical Formula 5 is preferably selected from the group consisting of carboxylic acid, carboxylic acid alkylester, acetate, and allylacetate.

The monomer solution further comprises a cycloolefin compound containing no polar functional group. The molar ratio of the cycloolefin compound containing no polar functional group is 30% by mole based on the total monomers in the monomer solution.

In accordance with the method of the invention, a homopolymer is prepared by polymerizing a same norbornene-based monomer containing a polar functional group, or a copolymer including di-, tri- and multi-copolymers is prepared by polymerizing different polar functional norbornene-based monomers, or a copolymer including di-, tri- and multi-copolymers is prepared by polymerizing a polar functional norbornene-based monomer and a cycloolefin monomer having no polar functional group.

In accordance with the method of the present invention, the cycloolefin polymer containing polar functional groups having a molecular weight of 100,000 or more can be prepared in a yield of 50% or higher. In order to fabricate an optical film using the cycloolefin polymer, the weight average molecular weight of the cycloolefin polymer is preferably controlled to 100,000-1,000,000.

In conventional polymerization system, cycloolefin polymers containing polar functional groups is prepared in a very low yield and in a low molecular weight, whereas the present method produces a high molecular weight of a cycloolefin polymer containing polar functional groups in a high yield.

Further, according to the method of the present invention, the deterioration of the catalytic activity by endo-isomers containing polar functional groups can be avoided. In addition, a high yield of the cycloolefin polymer can be achieved with a small amount of the catalyst, and the product yield of the prepared polymer is preferably 50% by weight or more based on the total weight of the monomer.

Furthermore, the norbornene-based polymer containing polar functional groups prepared in accordance with the method of the present invention is transparent, has sufficient adhesion to metals or polymers containing different polar functional groups, thermal stability and strength, and exhibits a low dielectric constant sufficient to be used as insulating electronic materials.

The cycloolefin polymer produced by the present invention has a desirable adhesion to substrates of electronic components without requiring a coupling agent, and at the same time, a sufficient adhesion to metal substrates, e.g., copper, silver and gold.

Further, the cycloolefin polymer of the present invention exhibits a desirable optical properties so that it can be used as materials for protective films of polarizing plates and electronic components such integrated circuits (ICs), printed circuit boards, multichip modules, and the like.

A cycloolefin polymer containing polar functional groups prepared by the present method is fabricated into an optical anisotropic film by using a general process which is known in the art. The optical anisotropic film thus prepared has 70 to 1000 nm of a retardation value (Rth), as defined by the following Equation 1.

$$R_{th} = \Delta(n_y - n_z) \times d \qquad \text{(Equation 1)}$$

In the Equation 1, $n_y$ is a refractive index in a fast axis direction in a plane, measured at a wavelength of 550 nm;

$n_z$ is a refractive index in a thickness direction, measured at a wavelength of 550 nm; and d is the film thickness.

The refractive index of the optical anisotropic film satisfies the following Equation 2.

$$n_x \cong n_y > n_z \quad \text{(Equation 2)}$$

In the Equation 2, $n_x$ is a refractive index in a slow axis direction in a plane, $n_y$ is a refractive index in a fast axis direction in the plane, and $n_z$ is a refractive index in a thickness direction.

The optical anisotropic film can be used as a negative C-plate type optical compensation film for Liquid Crystal Displays.

Hereinafter, the present invention will be described in more detail with reference to the following Examples. However, these Examples are given for the purpose of illustration and are not to be construed as limiting the scope of the invention.

In the following Examples, all operations for treating compounds sensitive to air or water were carried out in accordance with a standard Schlenk technique or dry box technique. Nuclear magnetic resonance spectra were obtained using Bruker 400 and 600 spectrometers. The molecular weights and molecular weight distributions of polymers were determined by GPC (gel permeation chromatography) using standard polystyrene samples. Thermal analyses, for example, TGA and DSC were performed using a TA Instrument (TGA 2050; heating rate 10 K/min).

Toluene was distilled and purified in sodium/benzophenone, and dichloromethane and chlorobenzene were distilled and purified in $CaH_2$.

Preparative Example 1

Preparation of 5-norbornene-2-carboxylic acid methylester

DCPD (dicyclopentadiene, Aldrich, 256.5 ml, 1.9 mol), methylacrylate (Aldrich, 405 ml, 4.5 mol) and hydroquinone (3.2 g, 0.03 mol) were charged into a 2 L high-pressure autoclave, and the temperature was raised to 220° C. The resulting mixture was reacted for 5 hours with stirring at 300 rpm. After the reaction was completed, the reaction mixture was cooled and transferred to a distilling apparatus. The reaction mixture was distilled under a reduced pressure (1 torr) using a vacuum pump to yield the title compound at 50° C. (yield: 57.6%, exo/endo=58/42).

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

Preparative Example 2

Preparation of endo-rich 5-norbornene-2-carboxylic acid methylester

DCPD (dicyclopentadiene, Aldrich, 256.5 ml, 1.9 mol), methylacrylate (Aldrich, 405 ml, 4.5 mol) and hydroquinone (3.2 g, 0.03 mol) were charged into a 2 L high-pressure autoclave, and the temperature was raised to 180° C. The resulting mixture was reacted for 5 hours with stirring at 300 rpm. After the reaction was completed, the reaction mixture was cooled and transferred to a distilling apparatus. The reaction mixture was distilled under a reduced pressure (1 torr) using a vacuum pump to yield the title compound at 50° C. (yield: 85%, exo/endo=41/59).

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

Preparative Example 3

Preparation of 5-norbornene-2-carboxylic acid butylester

DCPD (dicyclopentadiene, Aldrich, 180 ml, 1.34 mol), butylacrylate (Junsei, 500 ml, 3.49 mol) and hydroquinone (2.7 g, 0.025 mol) were charged into a 2 L high-pressure autoclave, and the temperature was raised to 190° C. The resulting mixture was reacted for 5 hours with stirring at 300 rpm. After the reaction was completed, the reaction mixture was cooled and transferred to a distilling apparatus. The reaction mixture was distilled under a reduced pressure (1 torr) using a vacuum pump to yield the title compound at 80° C. (yield: 78%, exo/endo=55/45).

$^1$H-NMR (600 MHz in $CDCl_3$): 6.12 (m, 2H), 4.09 (t, 2H), 3.17 (s, 1H), 3.04 (s, 1H), 2.92 (m, 1H), 2.20 (m, 1H), 1.90 (m, 1H), 1.60 (m, 2H), 1.40 (m, 4H), 0.94 (t, 3H)

Preparative Example 4

Preparation of 5-norbornene-2-carboxylic acid benzyl ester

DCPD (dicyclopentadiene, Aldrich, 67.32 ml, 0.5 mol), benzyl acrylate (Lancaster, 163 g, 1.0 mol) and hydroquinone (0.23 g, 2.1 mmol) were charged into a 2 L high-pressure autoclave, and the temperature was raised to 200° C. The resulting mixture was reacted for 5 hours with stirring at 300 rpm. After the reaction was completed, the reaction mixture was cooled and transferred to a distilling apparatus. The reaction mixture was distilled twice under a reduced pressure (1 torr) using a vacuum pump to yield the title compound at 190° C. (yield: 65%, exo/endo=56/44).

$^1$H-NMR (600 MHz, $CDCl_3$): δ 7.32 (m, 5H), 6.15~6.07 (m, 2H), 5.11~5.04 (m, 2H), 3.02~2.88 (m, 2H), 2.96 & 2.20 (m, 1H), 1.92 (m, 1H), 1.52~1.22 (m, 1H), 1.38 (m, 1H)

Preparative Example 5

Preparation of 5-norbornene-2-allylacetate

DCPD (dicyclopentadiene, Aldrich, 248 ml, 1.852 mol), allylacetate (Aldrich, 500 ml, 4.63 mol) and hydroquinone (0.7 g, 0.006 mol) were charged into a 2 L high-pressure autoclave, and the temperature was raised to 190° C. The resulting mixture was reacted for 5 hours with stirring at 300 rpm. After the reaction was completed, the reaction mixture was cooled and transferred to a distilling apparatus. The reaction mixture was distilled twice under a reduced pressure (1 torr) using a vacuum pump to yield the title compound at 56° C. (yield: 30%, exo/endo=57/43).

$^1$H-NMR (600 MHz, $CDCl_3$): δ 6.17~5.91 (m, 2H), 4.15~3.63 (m, 2H), 2.91~2.88 (m, 2H), 2.38 (m, 1H), 2.05 (s, 3H), 1.83 (m, 1H), 1.60~1.25 (m, 2H), 0.57 (m, 1H).

Preparative Example 6

Synthesis of (allyl)Pd(acac)

(Allyl)Pd(acac) was synthesized according to Imamura et al. (Bull. Chem. Soc. Jpn., 1969, Vol. 42, 805) and Jackson et al. (Aust. J. Chem., 1978, Vol. 31, 1073).

[(allyl)PdCl]$_2$ (1.83 g, 5.0 mmol) and sodium acetylacetonate (1.22 g, 10 mmol) were charged into a 250 ml Schlenk flask, and benzene (50 ml) was added thereto. The resulting mixture was reacted for about 1 hour at a room temperature. After the reaction was completed, the solvent was removed and a pure (allyl)Pd(acac) was obtained (yield 85%, 1.04 g).

Example 1

Polymerization of 5-norbornene-2-carboxylic acid methylester in dichloromethane (Catalyst: Pd(acac)$_2$, the Molar Ratio of the Catalyst to Borate Cocatalyst was 1:2)

Pd(acetylacetonate)$_2$ (acetylacetonate=acac, 3.5 mg, 11 μmol), dimethyl aniliniumtetrakis(pentafluorophenyl) borate (17.6 mg, 22 μmol) and tricyclohexylphosphine (3.0 mg, 11 μmol) as catalysts were charged into a 250 ml Schlenk flask in a dry box, and then 5 ml of dichloromethane was added thereto. 5-norbornene-2-carboxylic acid methylester (MENB, 10 ml, 55.6 mmol) prepared in Preparative Example 1 was added to the flask at room temperature. While the reaction temperature was raised to 90° C., the dichloromethane was removed under partial vacuum. Thereafter, the reaction mixture was reacted at 90° C. for 18 hours. The reaction mixture became viscous with the passage of time, and finally hardened after 10 hours. After the reaction was completed, 50 ml of toluene was added into the viscous solution to dilute it. The solution was poured into an excess of ethanol to precipitate a white polymer, which was filtered through a glass funnel, washed with ethanol, and dried in vacuo at 80° C. for 24 hours to yield 7.06 g of the polymer of 5-norbornene-2-carboxylic acid methylester (67.5% by weight, based on the total weight of the monomer).

Examples 2 to 4

Polymerization of 5-norbornene-2-carboxylic acid methylester in dichloromethane at Various Polymerization Temperatures (Catalyst: Pd(acac)$_2$, Molar Ratio of the Catalyst to Borate Cocatalyst was 1:2)

Polymers of 5-norbornene-2-carboxylic acid methylester were prepared in the same manner as described in Example 1, except that the molar ratios of the amount of Pd(acac)$_2$ as a catalyst to the monomer were changed to 5,000:1 and 10,000:1, as shown in Table 1, and the polymerization temperatures were changed to 100 and 110° C. The results are shown in Table 1 below.

TABLE 1

| Example Nos. | Monomer (ml) | Monomer/Pd (mol) | Temperature (° C.) | Time (h) | Yield [g] | Yield [%] | Mw | Mw/Mn |
|---|---|---|---|---|---|---|---|---|
| Example 1 | MENB(10) | 5000/1 | 90 | 18 | 7.06 | 67.5 | 185,100 | 2.16 |
| Example 2 | MENB(10) | 5000/1 | 100 | 10 | 7.98 | 76.3 | 166,300 | 2.15 |
| Example 3 | MENB(10) | 5000/1 | 110 | 10 | 8.30 | 79.4 | 149,400 | 2.45 |
| Example 4 | MENB(17) | 10000/1 | 110 | 10 | 13.57 | 76.3 | 155,800 | 2.13 |

Example 5

Polymerization of 5-norbornene-2-carboxylic acid methylester in dichloromethane (Catalyst: Pd(acac)$_2$, Molar Ratio of the Catalyst to Borate Cocatalyst was 1:2)

Pd(acac)$_2$ (4 mg), dimethyl aniliniumtetrakis (pentafluorophenyl) borate (21.1 mg) and tricyclohexylphosphine (3.7 mg) as catalysts were charged into a 250 ml Schlenk flask in a dry box, and then 5 ml of dichloromethane was added thereto. 5-norbornene-2-carboxylic acid methylester (10 ml) prepared in Preparative Example 1 was added to the flask at room temperature. The reaction temperature was raised to 80° C., and the reaction mixture was reacted at 80° C. for 18 hours. After the reaction was completed, 50 ml of toluene was added into a hardened polymer to dissolve it. The solution was poured into an excess of ethanol to precipitate a white polymer, which was filtered through a glass funnel, washed with ethanol, and dried in vacuo at 80° C. for 24 hours to yield 6.75 g of the polymer of 5-norbornene-2-carboxylic acid methylester (66.8% by weight, based on the total weight of the monomer). The molecular weight (Mw) of the polymer was 100,400, and Mw/Mn was 1.93.

Example 6

Polymerization of 5-norbornene-2-carboxylic acid methylester in dichloromethane (Catalyst: Pd(acac)$_2$, Molar Ratio of the Catalyst to Borate Cocatalyst was 1:1)

7.43 g (71.0% by weight, based on the total weight of the monomer) of the polymer of 5-norbornene-2-carboxylic acid methylester was prepared in the same manner as described in Example 1, except that 8.8 mg (11 μmol) of dimethyl aniliniumtetrakis (pentafluorophenyl) borate was used. The molecular weight of the polymer (Mw) was 184,500, and Mw/Mn was 2.08.

Example 7

Polymerization of 5-norbornene-2-carboxylic acid methylester in dichloromethane (Catalyst: Pd(acac)$_2$, Molar Ratio of the Catalyst to Borate Cocatalyst was 1:1)

7.95 g (76.0% by weight, based on the total weight of the monomer) of the polymer of 5-norbornene-2-carboxylic acid methylester was prepared in the same manner as described in Example 6, except that the polymerization temperature was changed to 100° C. The molecular weight of the polymer (Mw) was 181,800 and Mw/Mn was 2.13.

Example 8

Polymerization of 5-norbornene-2-carboxylic acid methylester in dichloromethane (Catalyst: Pd(acetate)$_2$, Molar Ratio of the Catalyst to Borate Cocatalyst was 1:2)

8.95 g (85.6% by weight, based on the total weight of the monomer) of the polymer of 5-norbornene-2-carboxylic acid methylester was prepared in the same manner as described in Example 1, except that Pd(acetate)$_2$ (2.5 mg, 11 μmol) was used in place of Pd(acac)$_2$. The molecular weight of the polymer (Mw) was 195,300 and Mw/Mn was 2.3.

Example 9

Polymerization of 5-norbornene-2-carboxylic acid methylester in dichloromethane (Catalyst: (allyl)Pd(acac), Molar Ratio of the Catalyst to Borate Cocatalyst was 1:2)

8.5 g (81.3% by weight, based on the total weight of the monomer) of the polymer of 5-norbornene-2-carboxylic acid methylester was prepared in the same manner as described in Example 1, except that (allyl)Pd(acac) (2.7 mg, 11 μmol) was used in place of Pd(acac)$_2$. The molecular weight of the polymer (Mw) was 185,000 and Mw/Mn was 2.2.

Example 10

Polymerization of endo-rich 5-norbornene-2-carboxylic acid methylester in dichloromethane at 90° C. (Catalyst: Pd(acac)$_2$, Molar Ratio of the Catalyst to Borate Cocatalyst was 1:2)

Pd(acac)$_2$ (3.4 mg, 11 μmol), dimethyl aniliniumtetrakis(pentafluorophenyl) borate (17.6 mg, 22 μmol) and tricyclohexylphosphine (3.0 mg, 11 μmol) as catalysts were charged into a 250 ml Schlenk flask in a dry box, and then 3 ml of dichloromethane was added thereto. Endo-rich 5-norbornene-2-carboxylic acid methylester (10 ml, 55.6 mmol) prepared in Preparative Example 2 was added to the flask at room temperature. After the reaction temperature was raised to 90° C., the reaction mixture was reacted at 90° C. for 18 hours. After the reaction was completed, 50 ml of toluene was added into the viscous solution to dilute it. The solution was poured into an excess of ethanol to precipitate a white polymer, which was filtered through a glass funnel, washed with ethanol, and dried in vacuo at 80° C. for 24 hours to yield 7.03 g of the polymer of 5-norbornene-2-carboxylic acid methylester (67.2% by weight, based on the total weight of the monomer). The molecular weight of the polymer (Mw) was 167,898, and Mw/Mn was 2.3.

Example 11

Polymerization of endo-rich 5-norbornene-2-carboxylic acid methylester in dichloromethane at 100° C. (Catalyst: Pd(acac)$_2$, Molar Ratio of the Catalyst to Borate Cocatalyst was 1:2)

6.9 g (66.0% by weight, based on the total weight of the monomer) of the polymer of 5-norbornene-2-carboxylic acid methylester was prepared in the same manner as described in Example 10, except that the polymerization temperature was changed to 100° C. The molecular weight of the polymer (Mw) was 157,033 and Mw/Mn was 2.4.

Examples 12 to 14

Polymerization of 5-norbornene-2-carboxylic acid butylester in dichloromethane at Various Polymerization Temperatures (Catalyst: Pd(acac)$_2$, Molar Ratio of the Catalyst to Borate Cocatalyst was 1:2)

Polymers of 5-norbornene-2-carboxylic acid butylester were prepared in the same manner as described in Example 1, except that 5-norbornene-2-carboxylic acid butylester were used as the monomer, and the polymerization temperatures were changed to 90, 100 and 120° C. as shown in Table 2. The results are shown in Table 2 below.

TABLE 2

| Example Nos. | Monomer (ml) | Temperature (° C.) | Time (h) | Yield | | Mw | Mw/Mn |
|---|---|---|---|---|---|---|---|
| Example 12 | BENB(20) | 90 | 18 | 14.02 | 72.1 | 186,200 | 2.07 |
| Example 13 | BENB(20) | 100 | 10 | 18.43 | 95.0 | 157,100 | 1.88 |
| Example 14 | BENB(20) | 120 | 4 | 16.30 | 84.0 | 130,000 | 1.85 |

Examples 15 to 17

Polymerization of 5-norbornene-2-carboxylic acid butylester in chlorobenzene at Various Polymerization Temperatures (Catalyst: Pd(acac)$_2$, Molar Ratio of the Catalyst to Borate Cocatalyst was 1:2)

Polymers of 5-norbornene-2-carboxylic acid butylester were prepared in the same manner as described in Example 12, except that chlorobenzene was used as a solvent in place of dichloromethane, and the polymerization temperatures were changed to 90, 100 and 110° C. as shown in Table 3. The results are shown in Table 3 below.

TABLE 3

| Example Nos. | Monomer (ml) | Temperature (° C.) | Time (h) | Yield | | Mw | Mw/Mn |
|---|---|---|---|---|---|---|---|
| Example 15 | BENB(20) | 90 | 18 | 12.86 | 66.1 | 149,400 | 2.02 |
| Example 16 | BENB(20) | 100 | 18 | 14.37 | 73.9 | 138,700 | 2.00 |
| Example 17 | BENB(20) | 110 | 18 | 17.28 | 88.9 | 13,800 | 1.96 |

Examples 18 and 19

Polymerization of 5-norbornene-2-carboxylic acid butylester in toluene at Various Polymerization Temperatures (Catalyst: Pd(acac)$_2$, Molar Ratio of the Catalyst to Borate Cocatalyst was 1:2)

Polymers of 5-norbornene-2-carboxylic acid butylester were prepared in the same manner as described in Example 12, except that toluene was used as a solvent in place of dichloromethane, and the polymerization temperatures were changed to 90 and 100° C. as shown in Table 4. The results are shown in Table 4 below.

TABLE 4

| Example Nos. | Monomer (ml) | Monomer/ Toluene | Temperature (° C.) | Time (h) | Yield | | Mw | Mw/Mn |
|---|---|---|---|---|---|---|---|---|
| Example 18 | BENB(20) | 2/1 | 90 | 18 | 11.66 | 60.0 | 128,100 | 1.94 |
| Example 19 | BENB(20) | 2/1 | 100 | 18 | 15.69 | 80.7 | 120,300 | 1.93 |

Example 20

Polymerization of 5-norbornene-2-carboxylic acid butylester in dichloromethane at 90° C. (Catalyst: Pd(acetate)$_2$, Molar Ratio of the Catalyst to Borate Cocatalyst was 1:2)

Pd(acetate)$_2$ (4.5 mg, 20 μmol), dimethyl anilinium tetrakis (pentafluorophenyl) borate (32.0 mg, 40 μmol) and tricyclohexylphosphine (5.6 mg, 20 μmol) as catalysts were charged into a 250 ml Schlenk flask in a dry box, and then 5 ml of dichloromethane was added thereto. 5-norbornene-2-carboxylic acid butylester (20 ml, 100 mmol) prepared in Preparative Example 3 was added to the flask at room temperature. While the reaction temperature was raised to 90° C., the dichloromethane was removed under partial vacuum. The reaction mixture was reacted at 90° C. for 18 hours. The reaction mixture became viscous with the passage of time, and finally hardened after 10 hours. After the reaction was completed, 50 ml of toluene was added into the viscous solution to dilute it. The solution was poured into an excess of ethanol to precipitate a white polymer, which was filtered through a glass funnel, washed with ethanol, and dried in vacuo at 80° C. for 24 hours to yield 10.02 g of the polymer of 5-norbornene-2-carboxylic acid butylester (51.5% by weight, based on the total weight of the monomer). The molecular weight of the polymer (Mw) was 153,033, and Mw/Mn was 2.4.

Example 21

Polymerization of 5-norbornene-2-carboxylic acid butylester in dichloromethane at 100° C. (Catalyst: Pd(acetate)$_2$, Molar Ratio of the Catalyst to Borate Cocatalyst was 1:2)

18.4 g (92.8% by weight, based on the total weight of the monomer) of the polymer of 5-norbornene-2-carboxylic acid butylester was prepared in the same manner as described in Example 20, except that the polymerization temperature was changed to 100° C. The molecular weight of the polymer (Mw) was 148,200 and Mw/Mn was 2.2.

Example 22

Polymerization of 5-norbornene-2-carboxylic acid butylester in dichloromethane (Catalyst: (allyl)Pd(acac), Molar Ratio of the Catalyst to Borate Cocatalyst was 1:2)

12.06 g (62.0% by weight, based on the total weight of the monomer) of the polymer of 5-norbornene-2-carboxylic acid butylester was prepared in the same manner as described in Example 20, except that (allyl)Pd(acac) (2.7 mg, 11 μmol) was used in place of Pd(acetate)$_2$. The molecular weight of the polymer (Mw) was 142,000 and Mw/Mn was 2.5.

Example 23

Copolymerization of 5-norbornene-2-carboxylic acid methylester and 5-norbornene-2-carboxylic acid butylester in dichloromethane (Catalyst: Pd(acac)$_2$, Mass Production)

Pd(acac)$_2$ (1.39 g), dimethyl aniliniumtetrakis (pentafluorophenyl) borate (1.28 g) and tricyclohexyl phosphine (1.28 g) as catalysts were charged into a 500 ml Schlenk flask in a dry box, and then 300 ml of dichloromethane was added thereto. 5-norbornene-2-carboxylic acid methylester (1046 g) prepared in Preparative Example 1, 5-norbornene-2-carboxylic acid butylester (3082 g) prepared in Preparative Example 3, and toluene (8300 g) were charged into a mass reactor at room temperature and the temperature of the mixture was raised to 80° C. At this temperature, the catalyst mixture was added to the mass reactor and the polymerization reaction was continued for 90 hours during which the viscosity of the reaction mixture was increased. After the polymerization reaction was completed, 10 kg of toluene was added into the viscous solution to dilute it. The solution was poured into an excess of ethanol to precipitate a white polymer, which was filtered through a glass funnel, washed with ethanol, and dried in vacuo at 80° C. for 24 hours to yield 2.2 kg of the copolymer of 5-norbornene-2-carboxylic acid methylester and 5-norbornene-2-carboxylic acid butylester (53.8% by weight, based on the total weight of the monomer). The molecular weight (Mw) of the copolymer was 115,000, and Mw/Mn was 1.6.

Example 24

Copolymerization of 5-norbornene-2-carboxylic acid methylester and 5-norbornene-2-carboxylic acid butylester in dichloromethane (Catalyst: Pd(acac)$_2$, Molar Ratio of the Catalyst to Borate Cocatalyst was 1:2)

Pd(acac)$_2$ (6.0 mg, 20 µmol), dimethyl aniliniumtetrakis(pentafluorophenyl) borate (32.0 mg, 40 µmol) and tricyclohexyl phosphine (5.6 mg, 20 µmol) as catalysts were charged into a 250 ml Schlenk flask in a dry box, and then 5 ml of dichloromethane was added thereto. 5-norbornene-2-carboxylic acid methylester (9 ml, 50 mmol) prepared in Preparative Example 1, 5-norbornene-2-carboxylic acid butylester (10 ml, 50 mmol) prepared in Preparative Example 3 were added to the flask at room temperature and the temperature of the mixture was raised to 100° C., during which the dichloromethane was removed under partial vacuum. While the polymerization was carried at that temperature for 18 hours, the viscosity of the reaction mixture was increased. After the polymerization reaction was completed, 50 ml of toluene was added into the viscous solution to dilute it. The solution was poured into an excess of ethanol to precipitate a white polymer, which was filtered through a glass funnel, washed with ethanol, and dried in vacuo at 80° C. for 24 hours to yield 16.02 g of the copolymer of 5-norbornene-2-carboxylic acid methylester and 5-norbornene-2-carboxylic acid butylester (83.7% by weight, based on the total weight of the monomer). The molecular weight (Mw) of the copolymer was 182,300 and Mw/Mn was 2.13.

Example 25

Copolymerization of 5-norbornene-2-carboxylic acid methylester and 5-norbornene-2-carboxylic acid butylester in dichloromethane at 110° C. (Catalyst: Pd(acac)$_2$, Molar Ratio of the Catalyst to Borate Cocatalyst was 1:2)

17.8 g (92.8% by weight, based on the total weight of the monomer) of the polymer of 5-norbornene-2-carboxylic acid methylester and 5-norbornene-2-carboxylic acid butylester was prepared in the same manner as described in Example 24, except that the polymerization temperature was changed to 110° C. The molecular weight of the polymer (Mw) was 164,600 and Mw/Mn was 2.43.

Example 26

Polymerization of 5-norbornene-2-allylacetate in toluene (Catalyst: Pd(acac)$_2$)

5-norbornene-2-allylacetate (5.0 g, 30.1 mmol) prepared in Preparative Example 5 and toluene (10 ml) were charged into a 250 ml Schlenk flask. A catalyst solution (dichloromethane: 3 ml) including Pd(acac)$_2$ (1.83 mg, 6.0 µmol), tricyclohexylphosphine (1.69 mg, 6.0 µmol), and dimethyl aniliniumtetrakis(pentafluorophenyl) borate (9.64 mg, 12.0 µmol) was added to the flask. The reaction mixture was reacted with stirring at 90° C. for 18 hours. After the polymerization reaction was completed, 50 ml of toluene was added into the viscous solution to dilute it. The solution was poured into an excess of ethanol to precipitate a white polymer, which was filtered through a glass funnel, washed with ethanol, and dried in vacuo at 80° C. for 24 hours to yield 4.79 g of a polymer of 5-norbornene-2-allylacetate (95.8% by weight, based on the total weight of the monomer). The molecular weight of the polymer (Mw) was 203,000 and Mw/Mn was 2.6.

Example 27

Polymerization of 5-norbornene-2-allylacetate in toluene (Catalyst: Pd(acetate)$_2$)

5-norbornene-2-allylacetate (5.0 ml, 30.9 mmol) prepared in Preparative Example 5 and toluene (10 ml) were added into a 250 ml Schlenk flask. A catalyst solution (dichloromethane: 1 ml) including Pd(acetate)$_2$ (1.4 mg, 6.2 µmol), tricyclohexylphosphine (1.9 mg, 6.8 µmol), and dimethyl aniliniumtetrakis(pentafluorophenyl) borate (10.0 mg, 13.6 µmol) was added to the flask. The reaction mixture was reacted with stirring at 90° C. for 4 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 4.45 g of the polymer of 5-norbornene-2-allylacetate (86.7% by weight, based on the total weight of the monomer). The molecular weight of the polymer (Mw) was 279,618 and Mw/Mn was 3.23.

Example 28

Polymerization of 5-norbornene-2-allylacetate in toluene (Catalyst: Pd(acetate)$_2$)

5-norbornene-2-allylacetate (5.0 ml, 30.9 mmol) prepared in Preparative Example 5 and toluene (15 ml) were added into a 250 ml Schlenk flask. A catalyst solution (dichloromethane: 1 ml) including Pd(acetate)$_2$ (0.7 mg, 3.1 µmol), tricyclohexylphosphine (1.0 mg, 3.4 µmol), and dimethyl aniliniumtetrakis(pentafluorophenyl) borate (5.4 mg, 6.8 µmol) was added to the flask. The reaction mixture was reacted with stirring at 90° C. for 6 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 4.70 g of the polymer of 5-norbornene-2-allylacetate (91.6% by weight, based on the total weight of the monomer). The molecular weight of the polymer (Mw) was 484,033 and Mw/Mn was 3.11.

Example 29

Polymerization of 5-norbornene-2-allylacetate in toluene (Catalyst: Pd(acetate)$_2$)

5-norbornene-2-allylacetate (5.0 ml, 30.9 mmol) prepared in Preparative Example 5 and toluene (15 ml) were added into a 250 ml Schlenk flask. A catalyst solution (dichloromethane: 1 ml) including Pd(acetate)$_2$ (0.46 mg, 2.1 µmol), tricyclohexylphosphine (0.64 mg, 2.3 µmol), and dimethyl aniliniumtetrakis(pentafluorophenyl) borate (3.6 mg, 4.5 µmol) was added to the flask. The reaction mixture was reacted with stirring at 80° C. for 8 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 4.44 g of the polymer of 5-norbornene-2-allylacetate (86.5% by weight, based on the total weight of the monomer). The molecular weight of the polymer (Mw) was 472,666 and Mw/Mn was 3.03.

Example 30

Polymerization of 5-norbornene-2-allylacetate in a High Pressure Reactor (Catalyst: Pd(acetate)$_2$)

5-norbornene-2-allylacetate (5.0 ml, 30.9 mmol) prepared in Preparative Example 5 and toluene (15 ml) were charged into a high pressure reactor with a stirrer. A catalyst solution (dichloromethane: 1 ml) including Pd(acetate)$_2$ (0.7 mg, 3.1 µmol), tricyclohexylphosphine (1.0 mg, 3.4 µmol), and dimethyl aniliniumtetrakis (pentafluorophenyl) borate (5.4 mg, 6.8 µmol) was added to the reactor. The reaction mixture was reacted with stirring at 130° C. for 6 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 4.51 g of the polymer of 5-norbornene-2-allylacetate (87.9% by weight, based on the total weight of the monomer). The molecular weight of the polymer (Mw) was 368,200 and Mw/Mn was 3.11.

Example 31

Polymerization of 5-norbornene-2-allylacetate in a High Pressure Reactor (Catalyst: Pd(acetate)$_2$)

5-norbornene-2-allylacetate (5.0 ml, 30.9 mmol) prepared in Preparative Example 5 and toluene (15 ml) were charged into a high pressure reactor with a stirrer. A catalyst solution (dichloromethane: 1 ml) including Pd(acetate)$_2$ (0.7 mg, 3.1 µmol), tricyclohexylphosphine (1.0 mg, 3.4 µmol), and dimethyl aniliniumtetrakis (pentafluorophenyl) borate (5.4 mg, 6.8 µmol) was added to the reactor. The reaction mixture was reacted with stirring at 150° C. for 6 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 4.17 g of the polymer of 5-norbornene-2-allylacetate (81.2% by weight, based on the total weight of the monomer). The molecular weight of the polymer (Mw) was 273,500 and Mw/Mn was 3.42.

Example 32

Polymerization of 5-norbornene-2-allylacetate in a High Pressure Reactor (Catalyst: Pd(acetate)$_2$)

5-norbornene-2-allylacetate (5.0 ml, 30.9 mmol) prepared in Preparative Example 5 and toluene (15 ml) were charged into a high pressure reactor with a stirrer. A catalyst solution (dichloromethane: 1 ml) including Pd(acetate)$_2$ (0.7 mg, 3.1 µmol), tricyclohexylphosphine (1.0 mg, 3.4 µmol), and dimethyl aniliniumtetrakis (pentafluorophenyl) borate (5.4 mg, 6.8 µmol) was added to the reactor. The reaction mixture was reacted with stirring at 170° C. for 6 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 3.82 g of the polymer of 5-norbornene-2-allylacetate (74.4% by weight, based on the total weight of the monomer). The molecular weight of the polymer (Mw) was 175,400 and Mw/Mn was 3.52.

Example 33

Polymerization of 5-norbornene-2-allylacetate in dichloromethane at 90° C. (Catalyst: (allyl)Pd(acac))

5.6 g (56.0% by weight, based on the total weight of the monomer) of the polymer of 5-norbornene-2-allylacetate was prepared in the same manner as described in Example 28, except that (allyl)Pd(acac) was used as the catalyst in place of Pd(acetate)$_2$. The molecular weight of the polymer (Mw) was 141,000 and Mw/Mn was 2.3.

Example 34

Copolymerization of 5-norbornene-2-carboxylic acid methylester and 5-norbornene-2-allylacetate in toluene (Catalyst: Pd(acetate)$_2$, 5-norbornene-2-carboxylic acid methylester/5-norbornene-2-allylacetate=½)

5-norbornene-2-carboxylic acid methylester (5.89 g, 38.7 mmol) prepared in Preparative Example 1, 5-norbornene-2-allylacetate (15.0 g, 90.2 mmol) prepared in Preparative Example 5 and toluene (41 ml) were added into a 250 ml Schlenk flask. A catalyst solution (dichloromethane: 5 ml) including Pd(acetate)$_2$ (2.89 mg, 13.0 µmol), tricyclohexylphosphine (3.62 mg, 13.0 µmol) and dimethyl aniliniumtetrakis(pentafluorophenyl) borate (20.66 mg, 26.0 µmol) was added to the flask. The reaction mixture was reacted with stirring at 90° C. for 18 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 10.48 g of the copolymer of 5-norbornene-2-carboxylic acid methylester and 5-norbornene-2-allylacetate (50.2% by weight, based on the total weight of the monomer). The molecular weight of the polymer (Mw) was 144,000 and Mw/Mn was 2.4.

Example 35

Copolymerization of 5-norbornene-2-carboxylic acid methylester and norbornene (Catalyst: Pd(acac)$_2$)

5-norbornene-2-carboxylic acid methylester (16.74 g) prepared in Preparative Example 1, norbornene (4.44 g) and toluene (37 ml) were added into a 250 ml Schlenk flask. Pd(acetate)$_2$ (4.79 mg) and tricyclohexylphosphine (4.41 mg) in toluene (5 ml) and dimethyl aniliniumtetrakis (pentafluorophenyl) borate (25.2 mg) in dichloromethane (2 ml) were added to the flask. The reaction mixture was reacted with stirring at 90° C. for 18 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 12.96 g of the copolymer of 5-norbornene-2-carboxylic acid methylester and norbornene (61.2% by weight, based on the total weight of the monomer). The molecular weight of the polymer (Mw) was 164,000 and Mw/Mn was 2.02.

Example 36

Copolymerization of 5-norbornene-2-carboxylic acid methylester and butylnorbornene (Catalyst: Pd(acac)$_2$)

5-norbornene-2-carboxylic acid methylester (14.64 g) prepared in Preparative Example 1, butylnorbornene (6.14 g) and toluene (37 ml) were added into a 250 ml Schlenk flask. Pd(acac)$_2$ (4.19 mg) and tricyclohexylphosphine (4.41 mg) in toluene (5 ml), and dimethyl aniliniumtetrakis (pentafluorophenyl) borate (25.2 mg) in dichloromethane (2 ml) were added to the flask. The reaction mixture was reacted with stirring at 90° C. for 18 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 12.08 g of the copolymer of 5-norbornene-2-carboxylic acid methylester and butylnorbornene (58.1% by weight, based on the total weight of the monomer). The molecular weight of the polymer (Mw) was 116,000 and Mw/Mn was 1.97.

Example 37

Copolymerization of 5-norbornene-2-acetate and hexylnorbornene (Catalyst: Pd(acac)$_2$)

5-norbornene-2-acetate (13.57 g), hexylnorbornene (6.82 g) and toluene (42 ml) were added into a 250 ml Schlenk flask. Pd(acac)$_2$ (3.9 mg) and tricyclohexylphosphine (3.6 mg) in toluene (5 ml) and dimethyl aniliniumtetrakis (pentafluorophenyl) borate (20.4 mg) in dichloromethane (2 ml) were added to the flask. The reaction mixture was reacted with stirring at 90° C. for 18 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 10.4 g of the copolymer of 5-norbornene-2-acetate and hexylnorbornene (51.0% by weight, based on the total weight of the monomer). The molecular weight of the polymer (Mw) was 231,000 and Mw/Mn was 2.11.

Example 38

Copolymerization of 5-norbornene-2-allylacetate and butylnorbornene (Catalyst: Pd(acac)$_2$)

5-norbornene-2-allylacetate (8.2 g) prepared in Preparative Example 1, butylnorbornene (3.2 g) and toluene (47 ml) were added into a 250 ml Schlenk flask. A catalyst solution (toluene: 5 ml) including Pd(acac)$_2$ (3.2 mg), tricyclohexylphosphine (4.0 mg) and dimethylanilinium tetrakis (pentafluorophenyl) borate (40.0 mg) were added to the flask. The reaction mixture was reacted with stirring at 90° C. for 18 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 8.85 g of the copolymer of 5-norbornene-2-carboxylic acid methylester and butylnorbornene (77.8% by weight, based on the total weight of the monomer). The molecular weight of the polymer (Mw) was 198,300 and Mw/Mn was 3.44.

Example 39

Copolymerization of 5-norbornene-2-carboxylic acid butylester and phenylnorbornene (Catalyst: Pd(acetate)$_2$)

5-norbornene-2-carboxylic acid butylester (9.19 g) prepared in Preparative Example 3, phenylnorbornene (4.5 g) and toluene (30 ml) were added into a 250 ml Schlenk flask. A catalyst solution (dichloromethane: 3 ml) including Pd(acac)$_2$ (1.98 mg), tricyclohexylphosphine (2.47 mg) and dimethyl aniliniumtetrakis(pentafluorophenyl) borate (14.1 mg) were added to the flask. The reaction mixture was reacted with stirring at 90° C. for 18 hours. After the polymerization reaction was completed, the reaction mixture was poured into an excess of ethanol to precipitate a white polymer, which was filtered through a glass funnel, washed with ethanol, and dried in vacuo at 65° C. for 24 hours to yield 8.28 g of the copolymer of 5-norbornene-2-carboxylic acid methylester and butylnorbornene (60.5% by weight, based on the total weight of the monomer). The molecular weight of the polymer (Mw) was 132,000 and Mw/Mn was 2.69.

Comparative Example 1

Polymerization of 5-norbornene-2-carboxylic acid butylester in dichloromethane (Catalyst: Pd(acac)$_2$)

1.23 (6.4% by weight, based on the total weight of the monomer) of the polymer of 5-norbornene-2-carboxylic acid butylester was prepared in the same manner as described in Example 11, except that the polymerization temperature was changed to 60° C.

Comparative Examples 2 to 4

Polymerization of 5-norbornene-2-carboxylic acid butylester at various polymerization temperatures in dichloromethane (Catalyst: Pd(acac)$_2$)

Polymers of 5-norbornene-2-carboxylic acid butylester were prepared in the same manner as described in Example 11, except that the polymerization temperatures were changed to 65, 70, and 75° C., respectively, as shown in Table 5 below. The results are shown in Table 5.

TABLE 5

| Comparative Example Nos. | Monomer (ml) | Temperature (° C.) | Time (h) | Yield [g] | Yield [%] | Mw | Mw/Mn |
|---|---|---|---|---|---|---|---|
| Comparative Example 1 | BENB(20) | 60 | 18 | 1.23 | 6.4 | 124,600 | 1.54 |
| Comparative Example 2 | BENB(20) | 65 | 18 | 1.30 | 6.7 | 134,200 | 1.67 |
| Comparative Example 3 | BENB(20) | 70 | 18 | 1.52 | 7.8 | 137,100 | 1.68 |
| Comparative Example 4 | BENB(20) | 75 | 18 | 2.15 | 11.1 | 146,100 | 1.88 |

Comparative Example 5

Polymerization of 5-norbornene-2-carboxylic acid methylester (Catalyst: [(allyl)PdCl)]$_2$, Molar Ratio of Monomers to Catalyst was 4000:1)

[(allyl)PdCl)]$_2$, (6.0 mg), lithiumtetrakis (pentafluorophenyl) borate (22.5 mg) and tricyclohexylphosphine (12.0 mg) as catalysts were charged into a 100 ml Schlenk flask in a dry box, and then 5 ml of toluene was added thereto. 5-norbornene-2-carboxylic acid methylester (10 ml) and toluene (20 ml) were added into a 250 ml Schlenk flask. At room temperature the catalyst mixture was added into the monomer solution, and then the reaction temperature was raised to 90° C., and the reaction mixture was reacted at 90° C. for 18 hours. Then, the reaction mixture was poured into an excess of ethanol. A polymer precipitate was not detected.

Comparative Example 6

Polymerization of 5-norbornene-2-carboxylic acid butylester (Molar Ratio of Monomers to Catalyst was 500:1)

[(allyl)PdCl)]$_2$ (18.8 mg), lithiumtetrakis (pentafluorophenyl) borate (70.6 mg) and tricyclohexylphosphine (36.1 mg) as catalysts were charged into a 100 ml Schlenk flask in a dry box, and then 5 ml of toluene was added thereto. 5-norbornene-2-carboxylic acid butylester (5 ml) and toluene (20 ml) were added into a 250 ml Schlenk flask. At room temperature the catalyst mixture was added into the monomer solution, and then the reaction temperature was raised to 90° C., and the reaction mixture was reacted at 90° C. for 18 hours. Then, the reaction mixture was poured into an excess of ethanol. A polymer precipitate was not detected.

Comparative Example 7

Polymerization of 5-norbornene-2-carboxylic acid butylester (Molar Ratio of Monomers to Catalyst was 100:1)

[(allyl)PdCl)]$_2$ (188 mg), lithiumtetrakis (pentafluorophenyl) borate (1.06 g) and tricyclohexylphosphine (361 mg) as catalysts were charged into a 100 ml Schlenk flask in a dry box, and then 10 ml of toluene was added thereto. 5-norbornene-2-carboxylic acid butylester (10 ml) and toluene (20 ml) were added into a 250 ml Schlenk flask. At room temperature the catalyst mixture was added into the monomer solution, and then the reaction temperature was raised to 90° C., and the reaction mixture was reacted at 90° C. for 18 hours. Then, the reaction mixture was poured into an excess of ethanol. A polymer precipitate was not detected.

As can be seen from Comparative Examples 1-4, polymerization reaction below 80° C., polymers having molecular weights of 100,000 or more were obtained, however the polymerization yields were very low. In Comparative Examples 5-7, polymer was not obtained from polymerization of ester norbornenes in the presence of catalysts having a hydrocarbyl-based ligand coordinated thereto. It is believed that such catalysts used in Comparative Examples 5-7 are not so thermally stable as those used in Examples having oxygen-containing ligands, so that they are inactivated by functional groups of the monomers at a high temperature. Therefore, according to the present invention, the catalyst having an oxygen-containing ligand is stable at a high temperature of 80° C. or higher, and is not inactivated by functional groups of cycloolefin monomers, allowing the production of cycloolefin polymer having a high molecular weight of 100,000 or higher.

Examples 40-42

Preparation of Film Using a Cycloolefin Polymer Containing Polar Functional Groups Each of the polymers prepared in Examples 4, 19, and 25 was mixed with a solvent to form a coating solution as shown in Table 6. The coating solution was cast on a glass substrate using a knife coater or a bar coater. Then, the substrate was dried at room temperature for 1 hour, and further dried at 100° C. for 18 hours. The glass plate was kept at −10° C. for 10 seconds, and the film on the glass plate was peeled with a knife to obtain a transparent film whose thickness variation was below 2%. The optical transmittance and thicknesses of the films at 400 to 800 nm are shown in Table 6.

Optical Anisotropy

The refractive index (n) of each transparent film was measured with an Abbe refractometer. The phase difference inside the film ($R_e$) was measured with an automatic birefringence meter (Wang Ja Instruments; KOBRA-21 ADH). The phase difference of the film thickness direction and the x-axis direction inside the film ($R_{th}$) was calculated by the following Equation 2, after measuring the phase difference when the angle between the incident light and the film plane was 50° ($R_\theta$).

$$R_{th} = \frac{R_\theta \times \cos\theta_f}{\sin^2\theta_f} \qquad \text{[Equation 2]}$$

The difference of refractive indices ($n_x-n_y$) and ($n_y-n_z$) were calculated by dividing $R_e$ and $R_{th}$ values by the film thickness. ($n_x-n_y$), $R_\theta$, $R_{th}$, and ($n_y-n_z$) values of each transparent film are shown in Table 6.

TABLE 6

| | Composition of film solution | | Physical properties of film | | | | | |
|---|---|---|---|---|---|---|---|---|
| Classification | Polymer (parts by weight) | Solvent (parts by weight) | Thickness (μm) | Optical transmittance (%) | n (refractive index) | $(n_x - n_y) \times 10^3$ | $R_{th}$ (nm/μm) | $(n_y - n_z) \times 10^3$ |
| Example 40 | Polymer (Ex. 4) 100 | THF, 560 | 114 | 92 | 1.52 | 0.008 | 5.78 | 5.78 |

TABLE 6-continued

| Classification | Composition of film solution | | Physical properties of film | | | | | |
|---|---|---|---|---|---|---|---|---|
| | Polymer (parts by weight) | Solvent (parts by weight) | Thickness (μm) | Optical transmittance (%) | n (refractive index) | $(n_x - n_y) \times 10^3$ | $R_{th}$ (nm/μm) | $(n_y - n_z) \times 10^3$ |
| Example 41 | Polymer (Ex. 19) 100 | MC: 360 TL: 200 | 120 | 92 | 1.50 | 0.009 | 2.13 | 2.13 |
| Example 42 | Polymer (Ex. 25) 100 | TL: 560 | 103 | 91 | 1.51 | 0.012 | 3.29 | 3.29 |

In Table 6, THF stands for tetrahydrofuran, MC stands for methylene chloride, and TL stands for toluene.

When the triacetate cellulose film ($n_y > n_z$) was overlapped to measure the $R_\theta$ value, all $R_\theta$ values of each film increased. This indicates that the films have negative birefringence ($n_y > n_z$) in the film thickness direction.

The refractive index of the optical anisotropic film satisfies the following equation 3.

$$n_x \approx n_y > n_z \quad \text{(Equation 3)}$$

In the Equation 3, $n_x$ is a refractive index in a slow axis direction in a plane, $n_y$ is a refractive index in a fast axis direction in the plane, and $n_z$ is a refractive index in a thickness direction.

Refractive index in the thickness direction of an anisotropic optical film made of the polymer of the present invention can be varied according to the control of the types and content of functional groups introduced in the polymer. Thus, the anisotropic film can be used as optical compensation films for various display devices including liquid crystal display.

Example 43

Adhesion Property of Butyl Ester Norbornene Homopolymer Film to PVA Polarizing Film A polymer film was prepared from the polymer of 5-norbornene-2-carboxylic acid butylester prepared in Example 19. The polymer film was corona-treated 3 times at a line speed of 6 m/min with 80 mA, and then the contact angle was measured. For water, the contact angle was 20.7°, and for diiodomethane, it was 22°. The surface tension was calculated as 76.9 m·N/m.

Within 30 minutes after the corona treatment, a sufficiently-dried PVA polarizing film (iodine type, transmittivity: 44%) was roll-pressed with 10 wt % of PVA solution. Then, it was dried at 80° C. for 10 minutes. The PVA polarizing panel with the butyl ester norbornene polymer film roll-pressed thereon showed a very good adhesion property.

According to the present invention, a high yield can be obtained by controlling the reaction temperature and reaction time of Diels-Alder reaction of exo-rich norbornene-ester based monomer comprising more than 50 mol % of exo norbornene-ester monomers. When the exo-rich norbornene-ester monomer is polymerized in the presence of a Group X transition metal catalyst system with a specific ligand, a norbornene-ester based addition polymer having a large molecular weight can be obtained in high yield.

The prepared norbornene-ester based addition polymer has superior optical characteristics so as to be used for a protection film of a polarizer, a retardation film, or a glass substrate, and has good adhesivity to a variety of substrates.

According to the method of the present invention, the deterioration of the catalytic activity by endo-isomers containing polar functional groups can be avoided. In addition, cycloolefin polymers can be produced in a high yield with the use of a small amount of the catalyst.

Furthermore, since the cycloolefin polymer containing polar functional groups prepared in accordance with the method of the present invention is transparent and has sufficient adhesion to metals or polymers containing different polar functional groups and enhanced thermal stability and strength, it can be used as an insulating electronic material.

Further, an isotropic optical film made of the polar functional cycloolefin polymer produced by the present method can be used as compensation films for various display devices because its refractive index in a thickness direction can be controlled depending on the types and contents of functional groups introduced in the polymer.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A method for preparing a cycloolefin polymer containing polar functional groups, comprising the steps of:
   preparing a catalyst mixture including
   i) a precatalyst represented by Chemical Formulae 1a, 1b, or 1c, containing a Group 10 transition metal having a ligand containing oxygen ions bonded to the metal;
   ii) a first cocatalyst which is tricyclohexylphosphine; and
   iii) a second cocatalyst which is dimethylanilinium tetrakis (perfluorophenyl)borate; and
   subjecting a monomer solution comprising a norbornene-based compound containing a polar functional group to an addition polymerization reaction in the presence of an organic solvent and the catalyst mixture, at a temperature of 80-200° C., wherein the total amount of the organic solvent is 50-800% by weight based on the total weight of the monomer contained in the monomer solution, and the product yield of the cycloolefin polymer is 50% by weight or more based on the total weight of the monomer,
   wherein the polymer comprises more than 30 mole % of norbornene-based compound containing a polar group represented by the following chemical formula 5:

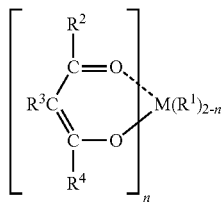

Chemical Formula 1a

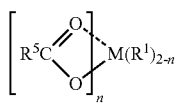

Chemical Formula 1b

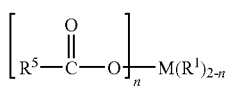

Chemical Formula 1c wherein
M is palladium,
n is 1 or 2,
$R^1$ is hydrogen; halogen; a linear or branched $C_{1-20}$ alkyl, allyl, alkenyl, or vinyl group; a $C_{3-12}$ cycloalkyl group unsubstituted or substituted with hydrocarbon(s); a $C_{6-40}$ aryl group unsubstituted or substituted with hydrocarbon(s); a $C_{6-40}$ alkyl or aryl group containing at least one hetero atom; a $C_{7-15}$ aralkyl group unsubstituted or substituted with hydrocarbon(s); a linear or branched $C_{3-20}$ alkynyl group; or anion thereof, and each of $R^2$, $R^3$, $R^4$, and $R^5$ is respectively selected from the group consisting of a hydrogen; a linear or branched $C_{1-20}$ alkyl, alkenyl, or vinyl group; a $C_{3-12}$ cycloalkyl group unsubstituted or substituted with hydrocarbon(s); a $C_{6-40}$ aryl group unsubstituted or substituted with hydrocarbon(s); a $C_{6-40}$ alkyl or aryl group containing at least one hetero atom; a $C_{7-15}$ aralkyl group unsubstituted or substituted with hydrocarbon(s); a linear or branched $C_{3-20}$ alkynyl group; or a linear or branched $C_{1-20}$ alkyl, aryl, aralkyl, alkenyl group containing at least one hetero atom including Si, Ge, S, O, or N; or a linear or branched $C_{1-20}$ alkyl, aryl, aralkyl, or alkenyl group containing one to ten halogen atom(s),

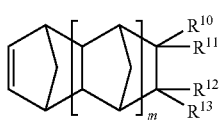

Chemical Formula 5 wherein
m is an integer of 0 to 4,
at least one of $R^{10}$, $R^{11}$, $R^{12}$ and $R^{13}$ is a polar functional group, and the others of $R^{10}$, $R^{11}$, $R^{12}$ and $R^{13}$ are a non-polar functional group which can be bonded together to form a saturated or unsaturated $C_{3-20}$ cyclic group or $C_{6-24}$ aromatic ring,
wherein the non-polar functional group is selected from the group consisting of hydrogen; halogen; a linear or branched $C_{1-20}$ alkyl group, alkenyl group, or vinyl group; a linear or branched $C_{1-20}$ haloalkyl group, or haloalkenyl group; a linear or branched $C_{3-20}$ alkynyl group, or haloalkynyl group; a $C_{3-12}$ cycloalkyl group unsubstituted or substituted with alkyl, alkenyl, alkynyl, halogen, haloalkyl, haloalkenyl, or haloalkynyl; a $C_{6-40}$ aryl group unsubstituted or substituted with alkyl, alkenyl, alkynyl, halogen, haloalkyl, haloalkenyl, or haloalkynyl; and a $C_{7-15}$ aralkyl group unsubstituted or substituted with alkyl, alkenyl, alkynyl, halogen, haloalkyl, haloalkenyl, or haloalkynyl, and the polar functional group includes a non-hydrocarbonaceous polar group containing at least one of O, N, P, S, and B, and is selected from the group consisting of $OR^{15}$, $R^{14}OR^{15}$, $OC(O)OR^{15}$, $R^{14}OC(O)OR^{15}$, $C(O)R^{15}$, $R^{14}C(O)R^{15}$, $OC(O)R^{15}$, $R^{14}OC(O)R^{15}$, $C(O)OR^{15}$, $R^{14}C(O)OR^{15}$, $(R^{14}O)_pOR^{15}$, $(OR^{14})_pOR^{15}$, $C(O)OC(O)R^{15}$, $R^{14}C(O)OC(O)R^{15}$, $SR^{15}$, $R^{14}SR^{15}$, $SSR^{15}$, $R^{14}SSR^{15}$, $S(=O)R^{15}$, $R^{14}S(=O)R^{15}$, $R^{14}C(=S)R^{15}$, $R^{14}C(=S)SR^{15}$, $R^{14}SO_3R^{15}$, $SO_3R^{15}$, $R^{14}N=C=S$, $NCO$, $R^{14}NCO$, $CN$, $R^{14}CN$, $NNC(=S)R^{15}$, $R^{14}NNC(=S)R^{15}$,

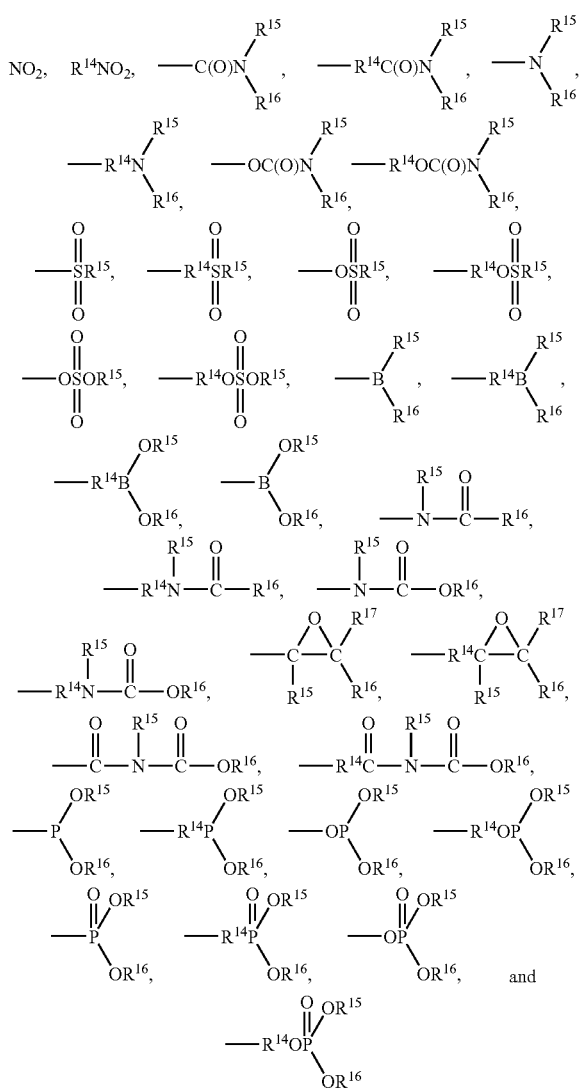

in which
p is an integer of 1 to 10,
$R^{14}$ is halogen; a linear or branched $C_{1-20}$ alkyl group; a linear or branched $C_{1-20}$ haloalkyl group; a linear or branched $C_{1-20}$ alkenyl group or vinyl group; a linear or branched $C_{1-20}$ haloalkenyl group; a linear or branched $C_{3-20}$ alkynyl group; a linear or branched $C_{3-20}$ haloalkynyl; a $C_{3-12}$ cycloalkyl group unsubstituted or substituted with alkyl, alkenyl, alkynyl, halogen, haloalkyl, haloalkenyl, or haloalkynyl; a $C_{6-40}$ aryl group unsubstituted or substituted with alkyl, alkenyl, alkynyl, halogen, haloalkyl, haloalkenyl, or haloalkynyl; and a $C_{7-15}$ aralkyl group unsubstituted or substituted with alkyl, alkenyl, alkynyl, halogen, haloalkyl, haloalkenyl, or haloalkynyl, and $R^{15}$, $R^{16}$, and $R^{17}$ are each independently hydrogen; a halogen; a linear or branched $C_{1-20}$ alkyl group; a linear or branched $C_{1-20}$ haloalkyl group; a linear or branched $C_{1-20}$ alkenyl group; a linear or branched $C_{1-20}$ haloalkenyl group; a linear or branched $C_{3-20}$ alkynyl group; a linear or branched $C_{3-20}$ haloalkynyl; a $C_{3-12}$ cycloalkyl group unsubstituted or substituted with alkyl, alkenyl, alkynyl, halogen, haloalkyl, haloalkenyl, or haloalkynyl; a $C_{6-40}$ aryl group unsubstituted or substituted with alkyl, alkenyl, alkynyl, halogen, haloalkyl, haloalkenyl, or haloalkynyl; a $C_{7-15}$ aralkyl group unsubstituted or substituted with alkyl, alkenyl, alkynyl, halogen, haloalkyl, haloalkenyl, or haloalkynyl; alkoxy; haloalkoxy; carbonyloxy; or halocarbonyloxy.

2. The method for preparing a cycloolefin polymer containing polar functional groups according to claim 1, wherein the precatalyst is selected from the group consisting of a Pd(II)β-diketonate, allyl Pd(II)β-ketonate, and Pd(II)carboxylate.

3. The method for preparing a cycloolefin polymer containing polar functional groups according to claim 1, wherein the organic solvent is selected from the group consisting of dichloromethane, dichloroethane, toluene, chlorobenzene and mixtures thereof.

4. The method for preparing a cycloolefin polymer containing polar functional groups according to claim 1, wherein the total amount of the organic solvent is 50-400% by weight based on the total weight of the monomer contained in the monomer solution.

5. The method for preparing a cycloolefin polymer containing polar functional groups according to claim 4, wherein the total amount of the organic solvent is 50-200% by weight based on the total weight of the monomer contained in the monomer solution.

6. The method for preparing a cycloolefin polymer containing polar functional groups according to claim 1, wherein the polymerization reaction is performed at a temperature of 80-170° C.

7. The method for preparing a cycloolefin polymer containing polar functional groups according to claim 6, wherein the polymerization reaction is performed at a temperature of 80-150° C.

8. The method for preparing a cycloolefin polymer containing polar functional groups according to claim 1, wherein the catalyst mixture includes a metal catalyst complex containing a cation complex made of the precatalyst and the first cocatalyst and an anion complex made of the second cocatalyst.

9. The method for preparing a cycloolefin polymer containing polar functional groups according to claim 1, wherein the catalyst mixture comprises, based on 1 mole of the precatalyst, 1-3 moles of the first cocatalyst; and 1-2 moles of the second cocatalyst.

10. The method for preparing a cycloolefin polymer containing polar functional groups according to claim 1, wherein the molar ratio of the catalyst mixture based on the Group 10 transition metal compound of the precatalyst to the monomer contained in the monomer solution is in the range of 1:2,500-1:100,000.

11. The method for preparing a cycloolefin polymer containing polar functional groups according to claim 1, wherein the polar functional group of Chemical Formula 5 is selected from the group consisting of carboxylic acid, carboxylic acid alkylester, acetate, and allylacetate.

12. The method for preparing a cycloolefin polymer containing polar functional groups according to claim 1, wherein the monomer solution further comprises a cycloolefin compound containing no polar functional group.

13. The method for preparing a cycloolefin polymer containing polar functional groups according to claim 12, wherein the molar ratio of the cycloolefin compound containing no polar functional group is 30% by mole based on the total monomers contained in the monomer solution.

14. The method for preparing a cycloolefin polymer containing polar functional groups according to claim 1, wherein the cycloolefin polymer containing polar functional groups includes a homopolymer of a cycloolefin monomer containing a polar functional group, a copolymer of cycloolefin monomers containing different polar functional groups, and a copolymer of cycloolefin monomers containing a polar functional group and cycloolefin monomers containing no polar functional group.

15. The method for preparing a cycloolefin polymer containing polar functional groups according to claim 1, wherein a weight average molecular weight (Mw) of the cycloolefin polymer containing polar functional groups is in the range of 100,000-1,000,000.

* * * * *